United States Patent
Bhat et al.

(10) Patent No.: US 12,482,001 B2
(45) Date of Patent: Nov. 25, 2025

(54) GATEWAY SERVICE DECISION PROCESS CONSOLIDATION

(71) Applicant: PayPal, Inc., San Jose, CA (US)

(72) Inventors: Rajendra Bhat, Bangalore (IN); Prabin Patodia, Bangalore (IN)

(73) Assignee: PayPal, Inc., San Jose, CA (US)

( * ) Notice: Subject to any disclaimer, the term of this patent is extended or adjusted under 35 U.S.C. 154(b) by 294 days.

(21) Appl. No.: 18/446,259

(22) Filed: Aug. 8, 2023

(65) Prior Publication Data

US 2025/0053991 A1 Feb. 13, 2025

(51) Int. Cl.
*G06Q 30/015* (2023.01)
*G06Q 20/40* (2012.01)
*H04L 67/566* (2022.01)

(52) U.S. Cl.
CPC .......... *G06Q 30/015* (2023.01); *G06Q 20/40* (2013.01); *H04L 67/566* (2022.05)

(58) Field of Classification Search
CPC .... G06Q 30/015; G06Q 20/40; G06Q 20/401; H04L 67/566; H04L 67/567
See application file for complete search history.

(56) References Cited

U.S. PATENT DOCUMENTS

| | | | | |
|---|---|---|---|---|
| 6,205,482 B1 * | 3/2001 | Navarre | ................ | H04L 63/08 |
| | | | | 709/227 |
| 7,042,988 B2 * | 5/2006 | Juitt | ................ | H04L 1/22 |
| | | | | 455/411 |
| 7,774,485 B2 * | 8/2010 | Patrick | ................ | G06Q 30/00 |
| | | | | 709/229 |
| 7,813,991 B1 * | 10/2010 | Keith | ................ | G06Q 10/087 |
| | | | | 705/28 |
| 8,234,231 B2 * | 7/2012 | Kelly | ................ | G06Q 30/02 |
| | | | | 702/19 |
| 8,429,297 B1 * | 4/2013 | Lim | ................ | H04L 67/02 |
| | | | | 709/228 |
| 8,806,490 B1 * | 8/2014 | Pulsipher | ................ | G06Q 10/10 |
| | | | | 718/100 |

(Continued)

FOREIGN PATENT DOCUMENTS

| | | | | |
|---|---|---|---|---|
| WO | WO-9942926 A1 * | 8/1999 | ............. | G06F 21/41 |
| WO | WO-9957620 A2 * | 11/1999 | ........... | H04Q 3/0029 |

*Primary Examiner* — James R Sheleheda
(74) *Attorney, Agent, or Firm* — Kowert, Hood, Munyon, Rankin & Goetzel, P.C.; Gareth M. Sampson; Dean M. Munyon (57) ABSTRACT

Various techniques are disclosed for providing gateway services between a client system and downstream service systems for a service system. The disclosed gateway service system is capable of providing a final decision response to a service request from the client system based on responses received from the downstream service systems. The gateway service system internally determines the final decision response through implementation of a decision determination processor in combination with a configuration file and a response mapping table. The configuration file provides information that allows the decision determination processor to determine the final decision response based on decision mapping in the response mapping table. In some instances, the decision determination processor may access a dynamic decision mapping model when the response mapping table does not provide a final decision response determination.

20 Claims, 6 Drawing Sheets

(56) References Cited

U.S. PATENT DOCUMENTS

| | | | |
|---|---|---|---|
| 9,298,539 B1* | 3/2016 | Kruck | G06F 11/0715 |
| 9,378,195 B2* | 6/2016 | Bernelas | G06F 40/169 |
| 9,733,901 B2* | 8/2017 | Bernelas | G06F 8/31 |
| 10,503,553 B1* | 12/2019 | Ashok | G06F 11/3024 |
| 10,623,275 B1* | 4/2020 | Castinado | G06Q 20/40 |
| 11,272,035 B1* | 3/2022 | Wu | H04L 67/02 |
| 11,336,453 B2* | 5/2022 | Jamkhedkar | H04L 9/3213 |
| 11,349,745 B2* | 5/2022 | Saka | H04L 43/0852 |
| 12,047,350 B2* | 7/2024 | Palanisamy | H04L 63/0209 |
| 12,182,732 B2* | 12/2024 | Song | G06N 5/022 |
| 12,210,542 B1* | 1/2025 | Bhat | G06Q 20/4016 |
| 2003/0095540 A1* | 5/2003 | Mulligan | H04L 67/563 370/352 |
| 2004/0139151 A1* | 7/2004 | Flurry | G06F 16/957 707/E17.119 |
| 2006/0202012 A1* | 9/2006 | Grano | G06Q 20/042 705/45 |
| 2007/0187491 A1* | 8/2007 | Godwin | G06Q 20/40 235/380 |
| 2009/0006614 A1* | 1/2009 | Le | H04L 67/025 709/224 |
| 2010/0114776 A1* | 5/2010 | Weller | G06Q 20/4016 705/325 |
| 2011/0035749 A1* | 2/2011 | Krishnakumar | G06F 9/4881 718/102 |
| 2011/0153478 A1* | 6/2011 | Mckay | G06Q 20/04 705/41 |
| 2011/0154026 A1* | 6/2011 | Edstrom | H04L 63/166 713/158 |
| 2011/0173017 A1* | 7/2011 | Salonen | G06Q 10/02 705/1.1 |
| 2011/0218905 A1* | 9/2011 | Zeringue | G06Q 20/10 705/38 |
| 2013/0060933 A1* | 3/2013 | Tung | H04L 41/5003 709/224 |
| 2013/0085977 A1* | 4/2013 | Junker | G06N 5/025 706/47 |
| 2013/0254335 A1* | 9/2013 | Inoue | G06F 16/258 709/217 |
| 2014/0195306 A1* | 7/2014 | Bernelas | G06Q 10/0637 705/7.36 |
| 2014/0250006 A1* | 9/2014 | Makhotin | G06Q 20/326 705/41 |
| 2015/0370232 A1* | 12/2015 | Kohn | G06N 5/04 700/287 |
| 2016/0098292 A1* | 4/2016 | Boutin | G06F 9/4881 718/104 |
| 2017/0024231 A1* | 1/2017 | Riel | G06F 9/5077 |
| 2017/0132522 A1* | 5/2017 | Junker | G06Q 30/0207 |
| 2017/0318095 A1* | 11/2017 | Webb | H04L 67/14 |
| 2017/0352020 A1* | 12/2017 | Jaeger | H04W 76/25 |
| 2018/0129699 A1* | 5/2018 | Gould | G06F 16/288 |
| 2018/0165119 A1* | 6/2018 | Gohil | G06F 9/54 |
| 2019/0130327 A1* | 5/2019 | Carpenter | H04L 41/0895 |
| 2020/0162431 A1* | 5/2020 | Goldschlag | H04L 9/3218 |
| 2020/0259667 A1* | 8/2020 | Garnier | H04L 67/12 |
| 2021/0124684 A1* | 4/2021 | Russell | G06F 12/0855 |
| 2021/0367919 A1* | 11/2021 | Palanisamy | H04L 12/66 |
| 2022/0321528 A1* | 10/2022 | Konda | H04L 61/4511 |
| 2023/0029198 A1* | 1/2023 | Guevin | H04L 67/10 |
| 2024/0037549 A1* | 2/2024 | Hefetz | H04W 4/029 |
| 2024/0061747 A1* | 2/2024 | Patodia | G06F 9/4881 |
| 2024/0202048 A1* | 6/2024 | Patodia | G06F 8/65 |
| 2024/0303109 A1* | 9/2024 | Patodia | H04L 67/60 |
| 2025/0053991 A1* | 2/2025 | Bhat | G06Q 30/015 |
| 2025/0077288 A1* | 3/2025 | Patodia | G06F 9/5027 |
| 2025/0126029 A1* | 4/2025 | Patodia | H04L 41/5012 |
| 2025/0184409 A1* | 6/2025 | Bhat | H04L 67/61 |
| 2025/0191061 A1* | 6/2025 | Naqvi | G06Q 40/03 |
| 2025/0208867 A1* | 6/2025 | Bhat | G06F 9/30029 |
| 2025/0225145 A1* | 7/2025 | Bhat | G06N 20/00 |

* cited by examiner

| Response Mapping Table 160 | | | |
|---|---|---|---|
| Downstream Service Response 135A | Downstream Service Response 135B | Downstream Service Response 135C | Decision Response 165 |
| DENY | APPROVE | APPROVE | DENY |
| APPROVE | APPROVE | APPROVE | APPROVE |
| APPROVE | APPROVE | DENY | APPROVE |
| APPROVE | APPROVE | UNDEFINED | DYNAMIC MODEL |
| UNDEFINED | APPROVE | DENY | DYNAMIC MODEL |

FIG. 3

| Conditional Execution 410 | Decision Response Threshold 420 | Decision Response 175 |
|---|---|---|
| Condition #1 | 20 | APPROVE |
| Condition #2 | 30 | HOLD |
| Condition #3 | 40 | APPROVE |
| Default (Base) | 50 | APPROVE |

GATEWAY SERVICE DECISION PROCESS CONSOLIDATION

BACKGROUND

Technical Field

This disclosure relates generally to implementing a gateway service in a service system, including methods for consolidation of various incoming responses from downstream services to determine a final response to a request in the gateway service, according to various embodiments.

Description of the Related Art

Gateway services are implemented in service systems to act as an entry point for multiple services, both upstream (e.g., client services) and downstream (e.g., decision services) of the gateway services. For instance, a gateway service may be responsible for calling multiple downstream decision services in response to a request from a client service. The gateway service may determine (e.g., orchestrate) which downstream services to call and, in some instances, which order to call the services. The downstream services may provide responses in their own defined format (e.g., determined by their own specifications). In some instances, the gateway service may simply pass on the responses from the downstream services and the client service determines a final decision by decoding the responses on its own. In other instances, the gateway service may include custom code that converts the responses to a common format for the client service. With either of these techniques, the code operated by the client or the gateway service needs to be rewritten when changes in the downstream services occur. Applicant recognizes that consolidation of the decision process in the gateway service along with reducing the amount of code relied upon for determining decision responses can be improved and provides solutions discussed herein.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to implementation of a gateway service in a service system (e.g., a "service computer system"). As used herein, the terms "service computer system" or "service system" refer to any online system that implements a service in which two or more parties use computer systems to exchange information. Examples of online systems include, but are not limited to, payment processing systems, transaction processing systems, social network systems, file transfer systems, online retailer systems, dating site systems, and customer service systems. Accordingly, a "service" according to this disclosure may include a transaction service, a payment service (e.g., PAYPAL), a social network, a file transfer service, an online retailer, a dating site, and so on. Note that generally, this disclosure may include various examples and discussion of techniques and structures within the context of a "service computer system" or "service system." Note that all these examples, techniques, and structures are generally applicable to any online system that allows access and the exchange of information to provide services to a user. For example, a service computer system may be any online system in some instances. However, the term service computer system is used for ease of understanding in various portions of this disclosure.

In many instances, a gateway service is utilized in a service system as an entry or coordination point between multiple services. The services may be upstream services such as client services or downstream services such as decision services. The gateway service may coordinate communication and exchange of information between the upstream services and the downstream services. For instance, in a service system, a gateway service may be responsible for calling multiple downstream services in response to a request from a client service. The gateway service may determine (e.g., orchestrate) which downstream services to call and, in some instances, which order to call the services. For a transaction service (e.g., a payment service), examples of downstream services to be called include decision services such as, but not limited to, limit based services, risk based services, or compliance based services.

Different downstream services may provide responses in their own defined format (e.g., determined by their own specifications). For example, a limit based service and a risk based service may provide responses in different formats. In some instances, the gateway service handles these different formats by simply passing on the responses from the downstream services and the client service determines a final decision by decoding the responses on its own. In other instances, the gateway service may include custom code to convert the responses to the same format and return them back to the client service. With either of these techniques, however, there are potentially complex issues when there are changes in the downstream services. For example, when a new downstream service is added or a downstream service changes the information it is reporting, the code operated by the client service or the gateway service likely needs to be rewritten. Rewriting code is time consuming and inefficient. Additionally, productivity may be reduced since the gateway service may be inoperable for a period of time while the code is rewritten and verified by the client service or the gateway service.

The present disclosure contemplates various techniques for a gateway service to consolidate the decision determination process within the gateway service and without the implementation of large amounts of code. For instance, in various embodiments, the gateway service includes a consolidation processor (e.g., decisions response determination processor) that has set code (such as Java code) to handle information received from downstream services in response to a client request, determine a final response, and provide the final response back to the client that made the request. The consolidation processor operates in combination with various elements including a configuration file (e.g., a YAML configuration file), a mapping table, and a dynamic decision mapping model (e.g., an AI-based runtime mapping table) to assess the various information (e.g., responses) received from downstream services and determine a final response for the request. These elements (e.g., the configuration file, the mapping table, and the dynamic decision mapping model) provide the necessary information for the consolidation processor to determine the final response in view of the responses received from downstream services after the client service request. Accordingly, these elements may be updated to account for changes in the downstream services while the code in the consolidation processor remains unchanged. Updating these elements is simpler and more efficient to respond to changes in downstream services instead of updating the code in the consolidation processor or codes in previous implementations of gateway services or client services.

In various embodiments, the configuration file includes information that identifies which parts of the mapping table to utilized based on responses received from the downstream services. For instance, the configuration file may identify where to look for information in the mapping table based on the sources of responses received by the gateway after the request (e.g., which downstream services provided responses to the request). The configuration file may also determine how to operate on the information from the mapping table based on the sources of the responses (e.g., what operation is needed to determine a final response based on responses from the downstream services).

In various embodiments, the mapping table includes a list of services (e.g., downstream services) and their responses mapped into the final decisions for the various possible scenarios involved with the services. Thus, in certain embodiments, the consolidation processor may implement operations according to the configuration file to make calls to the mapping table in order to determine a final response based on responses received from the downstream services. This final response may then be provided to the client.

In some instances, the mapping table may not be able to provide a final response decision. For instance, there may be insufficient data in the response received from the downstream services for the mapping table to provide a defined final response. In such instances, the consolidation processor may then invoke the dynamic decision mapping model (e.g., the AI-based runtime mapping table) to determine a final response. The dynamic decision mapping model may include one or more trained machine learning algorithms that provide a dynamic predictive score output based on the responses received and the context of the request. For example, the dynamic decision mapping model may implement dynamic decision model that implements conditional analysis of the responses received and the context of the request to generate the predictive score output. The predictive score may then be compared to a decision threshold to determine a final response decision (e.g., above/below threshold may indicate whether to approve/deny request). In certain embodiments, the dynamic decision mapping model includes a predetermined (e.g., default) dynamic decision model. Custom models (e.g., custom client models) may also be implemented in the dynamic decision mapping model as needed.

One embodiment described herein has two broad components: 1) receiving a plurality of downstream responses from the plurality of downstream services, and 2) determining a decision response to the service request based on the plurality of downstream responses by implementing a response mapping table according to a configuration file. In certain embodiments, a decision response determination module (e.g., a consolidation processor) operates to receive the downstream responses, access the response mapping table, access the configuration file, and determine the decision response. In some embodiments, a dynamic decision mapping model may be implemented when the downstream responses received from the downstream services have insufficient information to determine the decision response according to the response mapping table. In some embodiments, the response mapping table includes indications of instances when the downstream responses received from the downstream services have insufficient information to determine the decision response.

As described herein, with the implementation of the consolidation processor along with the configuration file, the mapping table, and the dynamic decision mapping model elements, changes in downstream services (e.g., changes in the information provided by a service or adding/removing services) may now be more readily handled by changing one or more of these elements (e.g., the configuration file, the mapping table, and the dynamic decision mapping model) instead of changing the code of the consolidation processor. Additionally, final responses to requests are now handled completely by the gateway, eliminating the need for client services to update or utilize any code for decoding individual responses from different downstream services. Consolidating these operations in the gateway (through the consolidation processor and its associated elements) and having updates to changes in downstream services be handled by the configuration file, the mapping table, and the dynamic decision mapping model allows for changes to be responded to more quickly. This gateway setup also reduces the time to market and involves less coding (only the initial consolidation processor setup involves coding) while providing a system that can be easily updated in response to downstream service changes.

Figure 1:
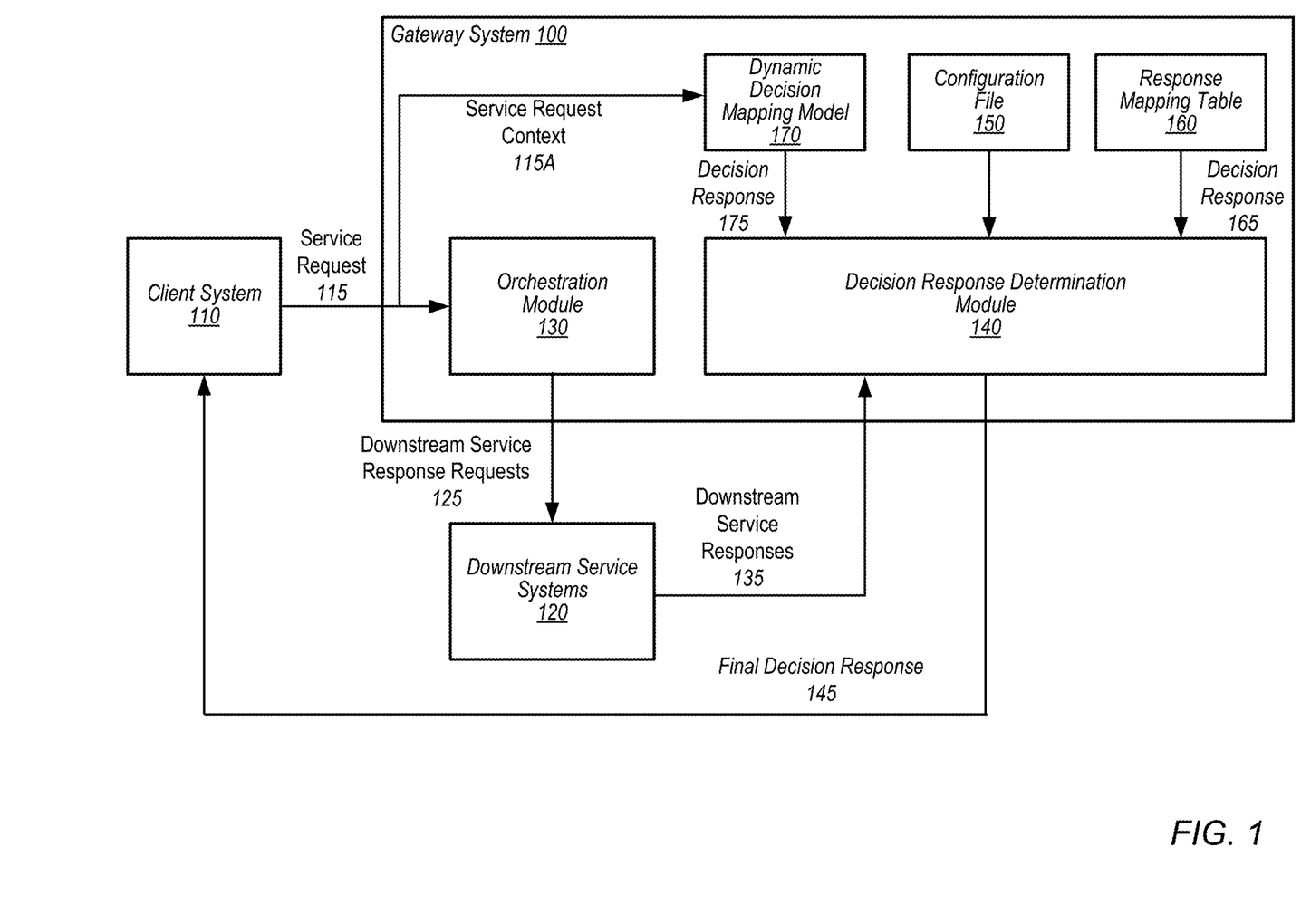
FIG. 1 is a block diagram of a gateway system, according to some embodiments.

FIG. 1 is a block diagram of a gateway system, according to some embodiments. In certain embodiments, gateway system 100 is implemented in a service system to determine decisions in response to requests from client system 110, as described herein. For instance, gateway system 100 may be implemented in a service system (such as PayPal®) to make calls to one or more downstream services 120 in response to a request from client system 110. The request may include, for example, a request for a service related decision such as a transaction approval decision. In various embodiments, gateway system 100 determines and provides a final decision response (e.g., decision response 145) to client system 110 based on the responses received from the downstream service systems 120.

In the illustrated embodiment, gateway system 100 includes orchestration module 130 and decision response determination module 140. Gateway system 100 and its components may be implemented by one or more computer processors operating as a computing system. As used herein, the term "computing system" refers to any computer system having one or more interconnected computing devices. Note that generally, this disclosure may include various examples and discussion of techniques and structures within the context of a "computer system." Note that all these examples, techniques, and structures are generally applicable to any computing system that provides computer functionality. The various components of a computing system (e.g., computing devices) may be interconnected. For instance, the components may be connected via a local area network (LAN). In some embodiments, the components may be connected over a wide-area network (WAN) such as the Internet.

In various contemplated embodiments, orchestration module 130 receives service request 115 from client system 110. In response to receiving service request 115, orchestration module 130 sends response requests 125 to downstream service systems 120, as shown in FIG. 1. Response requests 125 are requests of downstream service systems 120 to provide responses to service request 115 based on information included in the service request. For example, a service request may include customer information and the downstream service system may be asked to determine a response based on the customer information included in the service request. As noted above, for a transaction service, downstream service systems 120 may be associated with, but not be limited to, limit based services, risk based services, or compliance based services. Accordingly, examples of downstream service responses 135 returned to gateway system 100 by downstream service systems 120 include responses on limit decisions, responses on risk decisions, or responses on compliance decisions.

In various embodiments, orchestration module 130 determines which downstream service systems 120 to send response requests 125 based on information in service request 115 including the context of the service request. For instance, service request 115 may include information and have context that indicates which of downstream service systems 120 need to be contacted for responses. Orchestration module 130 may then route response requests 125 to the appropriate downstream service systems 120.

Figure 2:
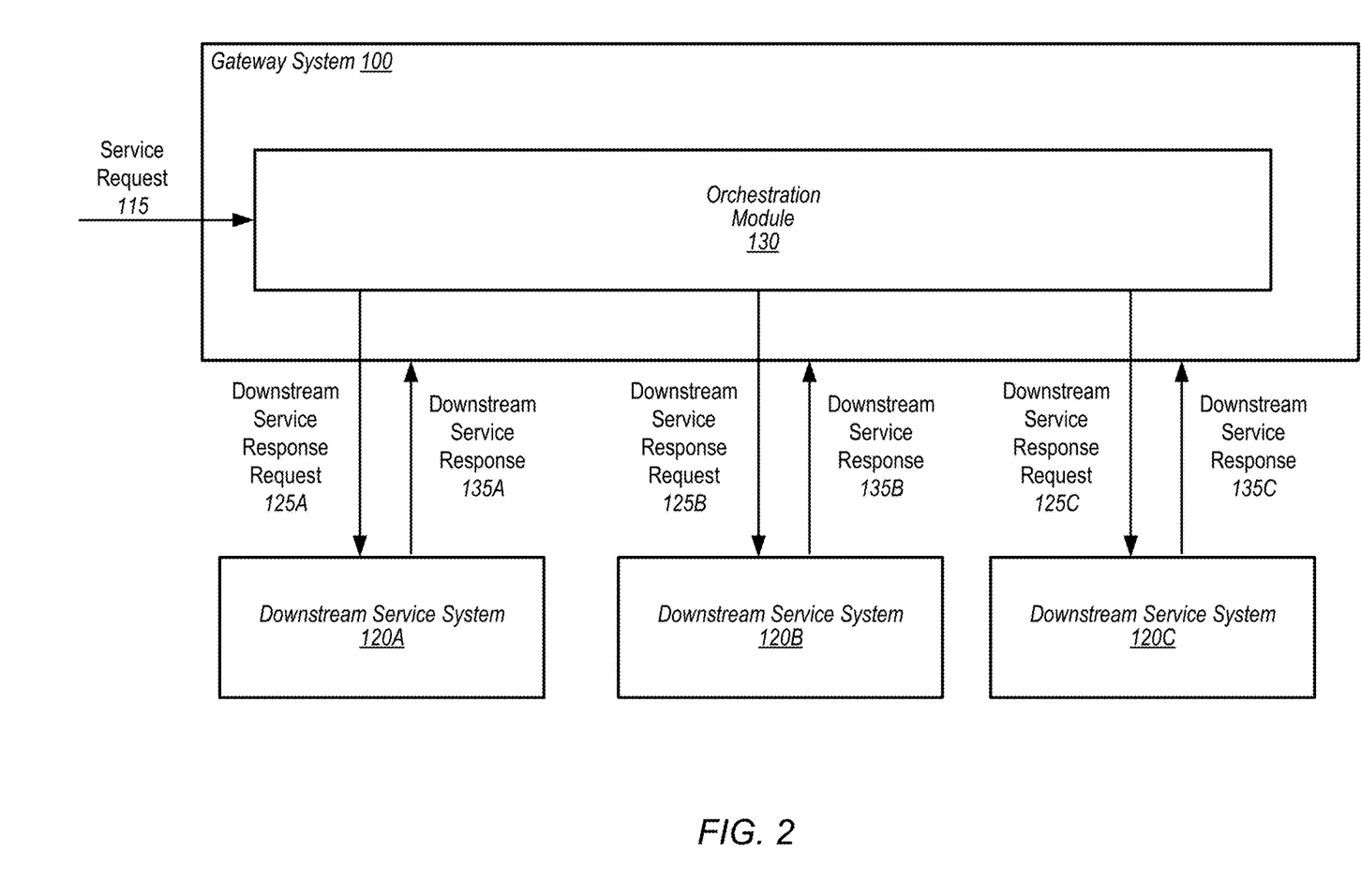
FIG. 2 is a block diagram showing an example of an orchestration module routing response requests to multiple downstream service systems, according to some embodiments.

FIG. 2 is a block diagram showing an example of an orchestration module routing response requests to multiple downstream service systems, according to some embodiments. In the illustrated embodiment, orchestration module 130 receives service request 115 and determines that three response requests 125A, 125B, 125C are to be sent to three corresponding downstream service systems 120A, 120B, 120C. Downstream service system 120A provides downstream service response 135A back to gateway system 100 after processing response request 125A. Downstream service system 120B provides downstream service response 135B back to gateway system 100 after processing response request 125B. Downstream service system 120C provides downstream service response 135C back to gateway system 100 after processing response request 125C.

In certain embodiments, orchestration module 130 is a client specific orchestration module (e.g., orchestration module 130 is specific to client system 110). Thus, if gateway system 100 services multiple client systems 110, the gateway system may include separate orchestration modules 130 associated with each client system that the gateway system services. Implementing client-specific orchestration modules 130 in gateway system 100 allows the gateway system to be modified to changes in client systems 110 the gateway system services by adding/removing the client-specific orchestration modules 130 as needed.

Turning back to FIG. 1, downstream service responses 135 are received by decision response determination module 140 in gateway system 100. In certain embodiments, decision response determination module 140 determines final decision response 145 based on information in downstream service responses 135. Final decision response 145 may be, for example, a decision response determined by decision response determination module 140 and returned to client system 110 in response to the initial service request 115. Decision response determination module 140 may implement various techniques in determining final decision response 145, as described herein. Having final decision response 145 determined by decision response determination module 140 eliminates the need for client system 110 to make any decision response determinations on its own.

In certain embodiments, decision response determination module 140 is a dedicated module implemented in gateway system 100 to determine final decision response 145 based on information received from multiple downstream service responses 135. In some embodiments, decision response determination module 140 includes JAVA program instructions executable to perform the operations described herein though other methods of implementation may be contemplated. In the illustrated embodiment, gateway system 100 includes configuration file 150, response mapping table 160, and dynamic decision mapping model 170. Configuration file 150, response mapping table 160, and dynamic decision mapping model 170 may be implemented in accessible elements in gateway system 100. For instance, configuration file 150, response mapping table 160, and dynamic decision mapping model 170 may be implemented in storage elements located in gateway system 100 that are accessible by decision response determination module 140.

In various embodiments, decision response determination module 140 accesses one or more of configuration file 150, response mapping table 160, and dynamic decision mapping model 170 to determine final decision response 145 based on downstream service responses 135. As used herein, response mapping table 160 includes information that provides a link between downstream service responses 135 and final decision response 145 based on the possible scenarios involving the downstream service responses. In certain embodiments, response mapping table 160 is a mapping table (e.g., a lookup table) that lists the downstream services (e.g., downstream service systems 120) and maps their possible responses (e.g., downstream service responses 135) into possible decision responses (e.g., final decision response 145 or another decision response). In some embodiments, response mapping table 160 maps all possible scenarios involving downstream service responses 135 from downstream service systems 120.

Figure 3:
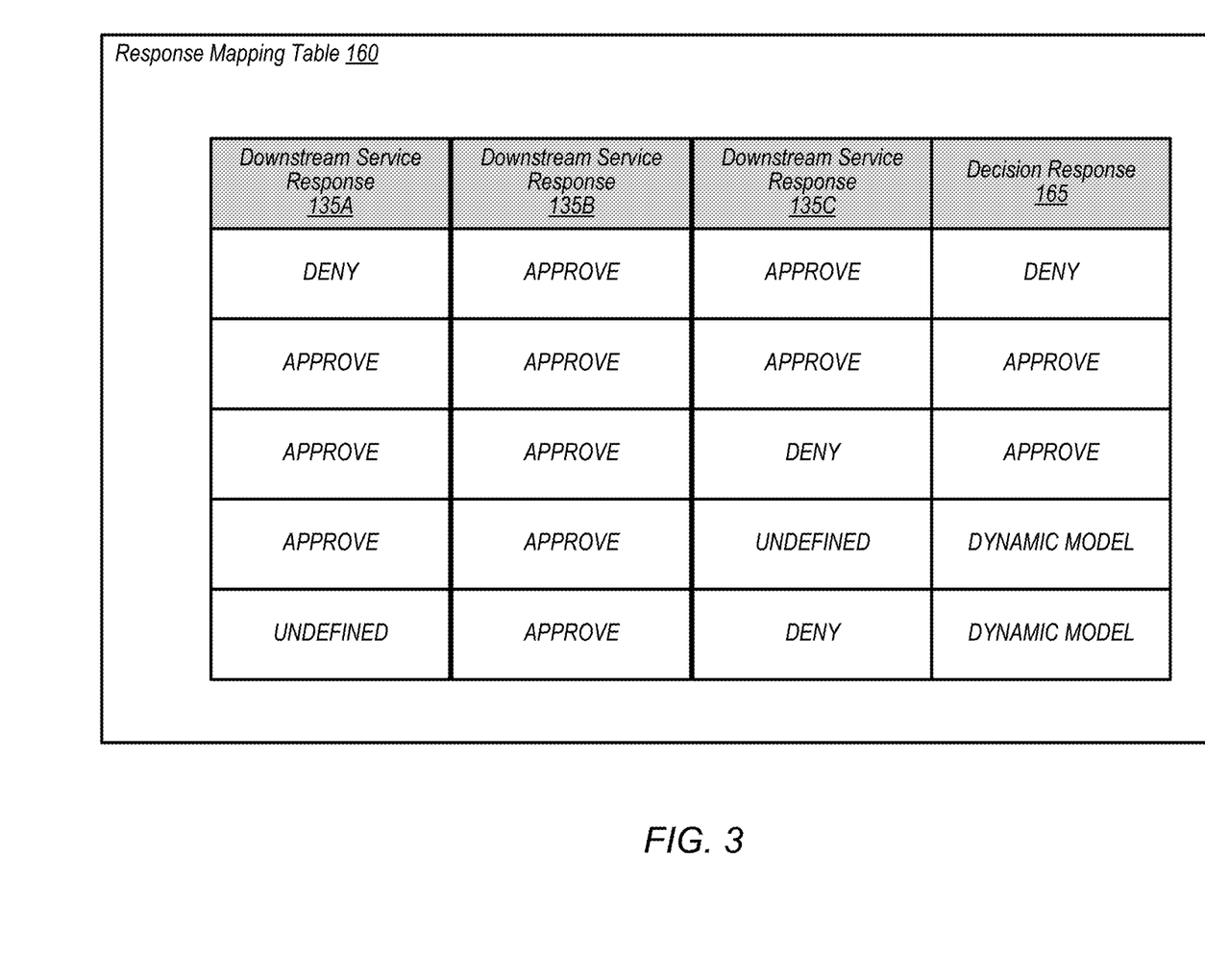
FIG. 3 depicts an example response mapping table, according to some embodiments.

FIG. 3 depicts an example response mapping table 160, according to some embodiments. In the illustrated example, response mapping table 160 is a mapping table associated with three downstream service systems (e.g., the three downstream service systems 120A, 120B, 120C and their corresponding downstream service responses 135A, 135B, 135C, shown in FIG. 2). Response mapping table 160 maps various scenarios involving downstream service response 135A, downstream service response 135B, and downstream service response 135C into different possible decision responses 165. In various embodiments, downstream service responses 135 generally fall into one of three categories—positive response, negative response, or indeterminable response. An indeterminable response may be a result when, for instance, a downstream service system 120 does not have enough information to determine a positive or negative response (e.g., there is insufficient data in service request 115 for the downstream service system to confidently determine a response). In the example of FIG. 3, possible downstream service responses 135 are identified as "APPROVE" (e.g., positive response), "DENY" (e.g., negative response), or "UNDEFINED" (e.g., indeterminable response).

Decision responses 165 may typically fall into similar categories—positive, negative, or indeterminable. In the example of FIG. 3, decision responses 145 are identified as "APPROVE" (positive), "DENY" (negative), or "DYNAMIC MODEL" (indeterminable). As further explained below, a decision response 145 of "DYNAMIC MODEL" (e.g., indeterminable) may be an indication that further analysis is needed, for example, by implementing dynamic decision mapping model 170. It is further noted that the downstream service responses 135 and decision responses 165 in the embodiment of FIG. 3 are provided merely as example and that other possible responses may be contemplated. For example, responses may vary based on the types of services being provided by gateway system 100.

Turning back to FIG. 1, in various embodiments, decision response determination module 140 accesses configuration file 150 in combination with accessing response mapping table 160. In certain embodiments, configuration file 150 includes information that identifies portions of response mapping table 160 to implement in determining a final decision response. Identifying the portions of response mapping table 160 to implement may include identifying which downstream service responses 135 to look at in order to determine a final decision response. In some embodiments, the portions to look at are identified based on service request 115 and the downstream service systems 120 from which decision response determination module 140 has received downstream service responses 135. Configuration file 150 may be, for example, a YAML configuration file or another mark-up language configuration file.

In some embodiments, the information in configuration file 150 includes information that identifies input fields and output fields in response mapping table 160 for decision response determination module 140 to access in order to determine decision responses 165 from downstream service responses 135. For instance, using the embodiment of response mapping table 160 shown in FIG. 3, configuration file 150 may identify downstream service responses 135A, 135B, 135C as input fields and decision responses 165 as the output field. Thus, configuration file 150 provides information utilized by decision response determination module 140 to determine where to look in response mapping table 160 and how to determine a final decision response based on the response mapping table. Configuration file 150 may include other contextual information identifying input fields or output fields. For example, configuration file 150 may provide context to the different downstream service responses 135A, 135B, 135C such as identifying the context of each downstream service response as one of "risk", "limit", or "compliance" based on the source of the downstream service response (e.g., the corresponding downstream service system 120A, 120B, or 120C).

In certain embodiments, decision response determination module 140 determines a final decision response (e.g., final decision response 145) according to response mapping table 160. For instance, response mapping table 160 may map to decision response 165 being either "APPROVE" (e.g., a positive response) or "DENY" (e.g., a negative response) based on downstream service responses 135A, 135B, 135C received by decision response determination module 140. In such embodiments, decision response determination module 140 outputs decision response 165 (determined from response mapping table 160) as final decision response 145 to client system 110, as shown in FIG. 1.

In various embodiments, as described above, one or more of downstream service systems 120 may not receive sufficient information to confidently determine a response (e.g., a positive or negative response). In such embodiments, the downstream service response 135 may return as indeterminable (e.g., "UNDEFINED", as shown in FIG. 3). In various instances, response mapping table 160 will indicate that receiving such a downstream service response 135 leads to an indeterminable decision response 165 (e.g., a "DYNAMIC MODEL" indication as shown in FIG. 3). While the example of FIG. 3 indicates a "DYNAMIC MODEL" decision response 165 in both instances of an "UNDEFINED" downstream service response, it should be understood that mappings may be possible where decision response 165 is determinable even with an undetermined input (such as when other downstream service responses are more important in determining a decision response than the downstream service response with insufficient information).

In various embodiments, when response mapping table 160 provides the indication of an indeterminable decision response as decision response 165, decision response determination module 140 may access dynamic decision mapping model 170 in order to get decision response 175 from the dynamic decision mapping model, which may then be implemented as final decision response 145. For instance, when decision response 165 from response mapping table 160 is found to be "DYNAMIC MODEL" (e.g., an indeterminable decision response), then decision response determination module 140 accesses dynamic decision mapping model 170 to get decision response 175. In some embodiments, instructions to access dynamic decision mapping model 170 when an indeterminable decision response is received are found in configuration file 150. Otherwise, decision response determination module 140 may be programmed to access dynamic decision mapping model 170 when an indeterminable decision response is received.

Dynamic decision mapping model 170 may be a machine learning algorithm model or another predictive model that determines a predictive score output based on an input of downstream service responses 135 and the context from the initial service request (e.g., service request context 115A). Accordingly, dynamic decision mapping model 170 may be implemented to make a determination of a decision response based on context of initial service request in instances where a straightforward decision based on downstream service response 135 using response mapping table 160 is not achievable. In certain embodiments, dynamic decision mapping model 170 is a model implemented in gateway system 100 during initialization of the gateway system and decision response determination module 140. For example, dynamic decision mapping model 170 may be implemented by developers of gateway system 100 and decision response determination module 140. In some embodiments, dynamic decision mapping model 170 may be customized to particular client systems (e.g., client system 110). For instance, client systems may develop a custom dynamic decision mapping model that is configured into gateway system 100. In some embodiments, an owner of gateway system 100 may provide solutions that allow client systems to develop their own dynamic decision mapping models that can be readily configured into gateway system 100 (e.g., configured to be plug and play into the gateway system).

When dynamic decision mapping model 170 is accessed (e.g., invoked) by decision response determination module 140, the predictive score output determined by the dynamic decision mapping model may be assessed against a decision response threshold to determine decision response 175. In certain embodiments, decision response 175 is determined based on whether the predictive score output determined by dynamic decision mapping model 170 satisfies the decision response threshold. For example, decision response 175 may be a positive response (e.g., "APPROVE") when the predictive score output satisfies the decision response threshold. Alternatively, decision response 175 may be a negative response (e.g., "DENY") when the predictive score output does not satisfy the decision response threshold.

Figure 4:
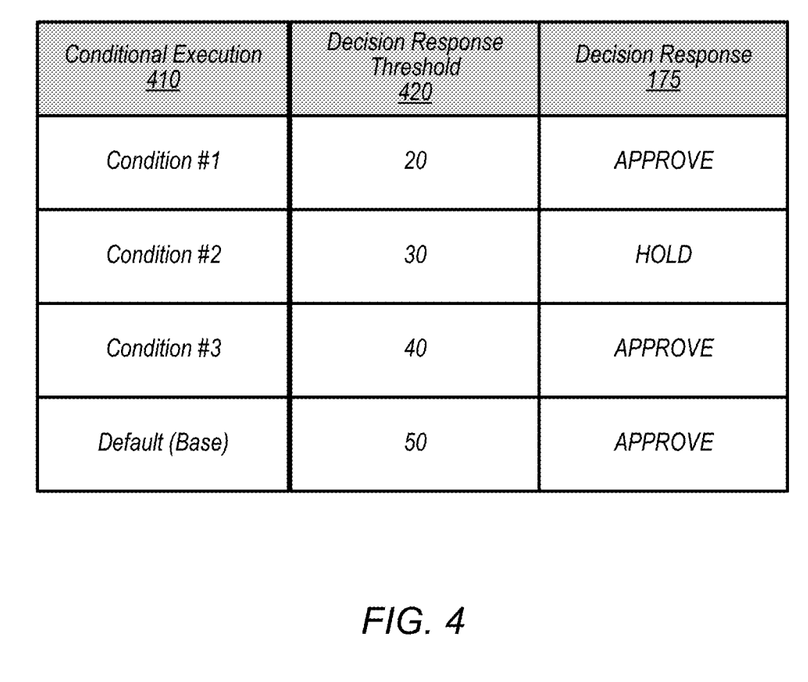
FIG. 4 depicts an example of conditional executions implemented by a dynamic decision mapping model, according to some embodiments.

In certain embodiments, the decision response threshold is a threshold determined during initialization of dynamic decision mapping model 170. In some embodiments, the decision response threshold may vary based on a conditional logic flow (e.g., conditional executions). FIG. 4 depicts an example of conditional executions implemented by a dynamic decision mapping model, according to some embodiments. In the illustrated example, there are three conditional executions 410 in addition to the default (base) condition. The default (base) condition corresponds to a decision response threshold 420 of 50 and a decision response 175 of "APPROVE" (e.g., positive response) when the decision response threshold of 50 is satisfied by the prediction score output.

Conditional executions 410 may include assessment of conditions in downstream service responses 135, service request context 115A, or a combination thereof. Based on an assessment of the conditions in the different conditional executions, decision response threshold 420 may vary. For example, as shown in FIG. 4, decision response threshold 420 has a default value of 50 but varies to 20 when condition #1 is met, 30 when condition #2 is met, or 40 when condition #3 is met.

In some embodiments, one or more of the conditional executions may affect the decision response determined based on satisfying the decision response threshold. For instance, a conditional execution may change the decision response from a positive response to a negative response when the decision response threshold is satisfied based on the condition being met. As an example, when condition #2 is met in FIG. 4, decision response 175 changes to "HOLD", which is negative response and a change from the positive response of "APPROVE".

Turning back to FIG. 1, when decision response 175 is accessed from dynamic decision mapping model 170, decision response determination module 140 may output decision response 175 as final decision response 145 and provide the final decision response to client system 110 in response to service request 115. As described above, final decision response 145 may be either decision response 165 (determined from response mapping table 160) or decision response 175 (determined by dynamic decision mapping model 170). Both decision response 165 and decision response 175 are decision responses determined by decision response determination module 140 in gateway system 100 based on downstream service responses 135 received from downstream service systems 120 without any additional communication outside of the gateway system. Accordingly, implementing decision response determination module 140 in gateway system 100 enables the gateway system to be capable of internally determining final decision response 145 and sending the final decision response to client system 110 in response to service request 115. Having gateway system 100 determine final decision response 145 on its own and provide the final decision response to client system 110 removes the need for separate programming (e.g., programming code) in the client system.

Additionally, the implementation of decision response determination module 140 in combination with configuration file 150, response mapping table 160, and dynamic decision mapping model 170 enables gateway system 100 to determine final decision response 145 without a large set of programming code. As described above, decision response determination module 140 includes programming code while configuration file 150, response mapping table 160, and dynamic decision mapping model 170 are elements in gateway system 100 that do not include any programming code. Thus, only the programming code involving decision response determination module 140 is implemented in gateway system 100 whereas previous systems typically have programming code to handle operations associated with each of decision response determination module 140, configuration file 150, response mapping table 160, and dynamic decision mapping model 170.

In many instances, there may be one or more changes in systems downstream of gateway system 100 (e.g., changes to downstream service systems 120) while gateway system 100 is in operation. For example, downstream service systems 120 may be added or removed from operation with gateway system 100. A downstream service system may also undergo a change when there is a change in API (application programming interface) specification for the downstream service system. The change in API specification may cause a change in information provided in a response from the downstream service system (e.g., information is either added or subtracted from the response). API specification changes occur fairly frequently as APIs are typically not constant entities. Changes in downstream service systems may also occur when there is a change in where information is stored in a downstream service system.

In various contemplated embodiments, changes to downstream service systems 120 for gateway system 100 may be accommodated (e.g., handled) by changing one or more of configuration file 150, response mapping table 160, and dynamic decision mapping model 170. For instance, when a new downstream service system is added to the downstream service systems 120, configuration file 150 may be updated to accommodate the addition of the new downstream service system by adding the new downstream service system to the systems recognized by the configuration file. Updating configuration file 150 may include, for example, updating where to look in response mapping table 160 based on the addition of the new downstream service system. Response mapping table 160 may be correspondingly updated along with configuration file 150 to implement downstream service responses associated with the new downstream service system in determinations of decision responses by the response mapping table. Dynamic decision mapping model 170 may also be modified to accommodate information received from the new downstream service system (e.g., the model may be updated to include downstream service responses from the new downstream service system in the determination of the predictive score output).

While a change in a downstream service system may necessitate changes in configuration file 150, response mapping table 160, and/or dynamic decision mapping model 170, these changes are easier modifications than having to completely reprogram code, test code, and implement new code. For example, a developer may be able to update configuration file 150 in a matter of a few days as compared to taking weeks to months to reprogram and test code. Additionally, with the changes being file or table based, the potential for errors in updating gateway system 100 are reduced versus reprogramming the gateway system. The changes to gateway system 100 may also be implemented without having to restart the gateway system as the changes may be accommodated by updating the elements directly within the gateway system. Yet another advantage is that debugging of issues with decision response provided by gateway system 100 may be simpler as all the decision responses are handled by the gateway system rather than multiple systems (e.g., the gateway system and the client system). Client systems are now also agnostic to any changes in downstream service systems since the client system does not have any need to be updated based on changes downstream of gateway system 100.

Example Methods

Figure 5:
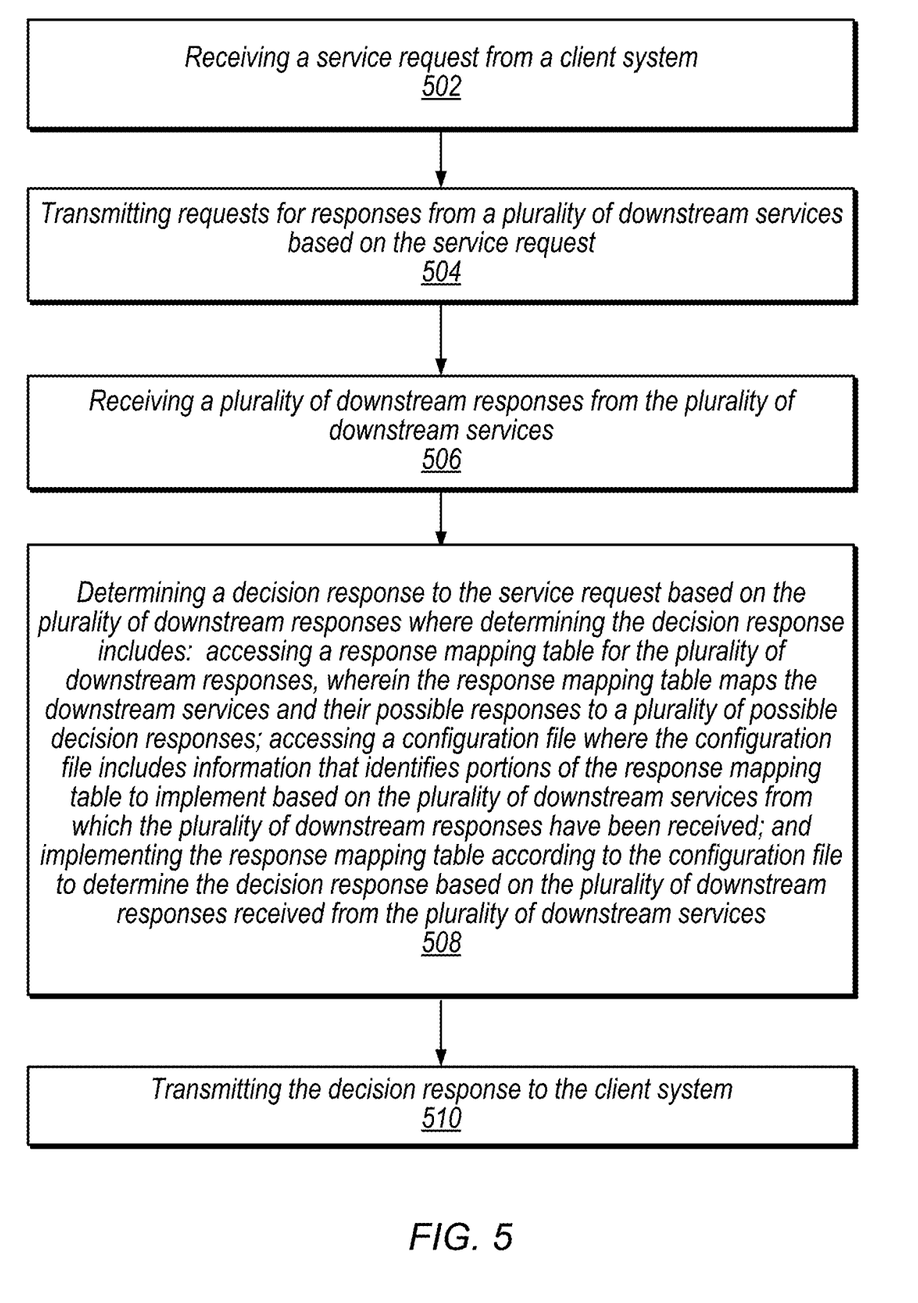
FIG. 5 is a flow diagram illustrating a method for determining a decision response to a service request, according to some embodiments.

FIG. 5 is a flow diagram illustrating a method for determining a decision response to a service request, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 610, described below.

At 502, in the illustrated embodiment, a computer system receives a service request from a client system.

At 504, in the illustrated embodiment, the computer system transmits requests for responses from a plurality of downstream services based on the service request.

At 506, in the illustrated embodiment, the computer system receives a plurality of downstream responses from the plurality of downstream services.

At 508, in the illustrated embodiment, the computer system determines a decision response to the service request based on the plurality of downstream responses where determining the decision response includes: accessing a response mapping table for the plurality of downstream responses where the response mapping table maps the downstream services and their possible responses to a plurality of possible decision responses; accessing a configuration file, wherein the configuration file includes information that identifies portions of the response mapping table to implement based on the plurality of downstream services from which the plurality of downstream responses have been received; and implementing the response mapping table according to the configuration file to determine the decision response based on the plurality of downstream responses received from the plurality of downstream services.

At 510, in the illustrated embodiment, the computer system transmits the decision response to the client system.

In some embodiments, when the plurality of downstream responses received from the plurality of downstream services have insufficient information to determine the decision response according to the response mapping table, the computer system accesses a dynamic decision mapping model, implements the dynamic decision mapping model to determine a predictive score output based on the plurality of downstream responses received from the plurality of downstream services and a context of the service request from the client, and determines the decision response based on whether the predictive score output satisfies a decision response threshold.

Example Computer System

Figure 6:
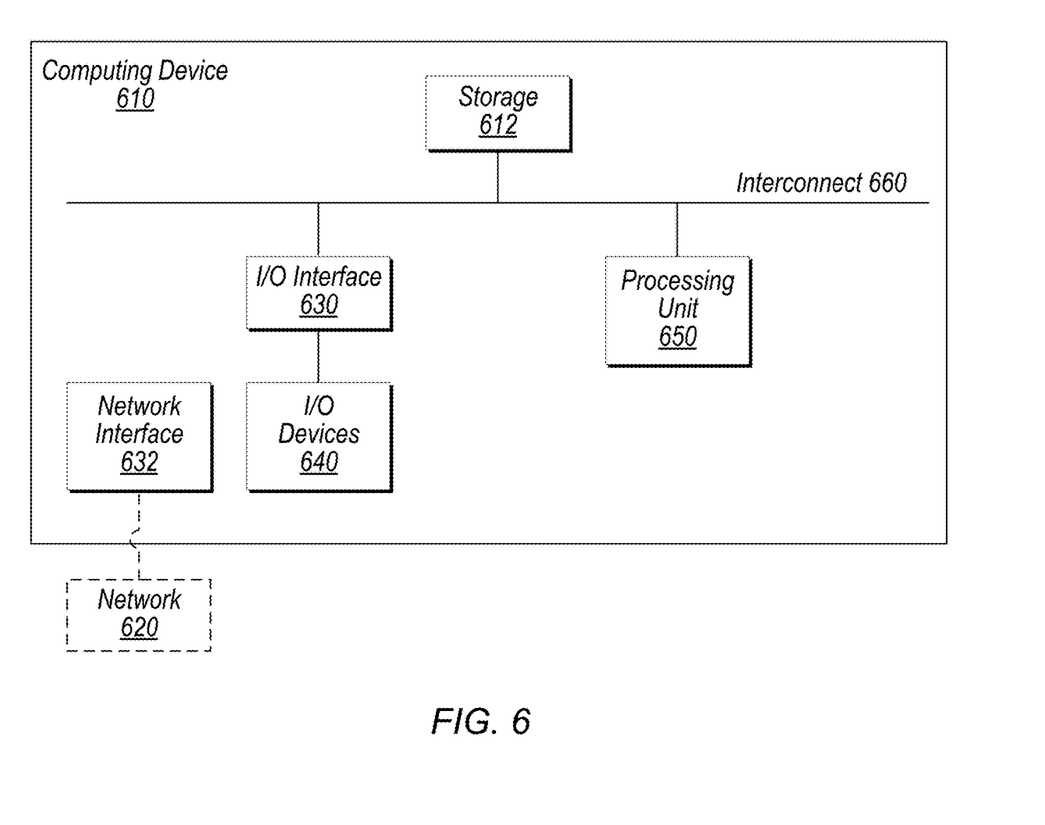
FIG. 6 is a block diagram of one embodiment of a computer system.

Turning now to FIG. 6, a block diagram of one embodiment of computing device (which may also be referred to as a computing system) 610 is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 612 is usable by processing unit 650 (e.g., to store instructions executable by and data used by processing unit 650). Storage 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 612 may consist solely of volatile memory, in one embodiment. Storage 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    receiving, by a computer system of a service system, a service request from a client system;
    transmitting, by the computer system, requests for responses from a plurality of downstream services based on the service request;
    receiving, by the computer system, a plurality of downstream responses from the plurality of downstream services;
    determining, at the computer system, a decision response to the service request based on the plurality of downstream responses, wherein determining the decision response includes:
        accessing a response mapping table for the plurality of downstream responses, wherein the response mapping table maps the downstream services and their possible responses to a plurality of possible decision responses;
        accessing a configuration file, wherein the configuration file includes information that identifies portions of the response mapping table to implement based on the plurality of downstream services from which the plurality of downstream responses have been received;
        implementing the response mapping table according to the configuration file to determine the decision response based on the plurality of downstream responses received from the plurality of downstream services; and
    transmitting, by the computer system, the decision response to the client system.

2. The method of claim 1, further comprising, when the plurality of downstream responses received from the plurality of downstream services have insufficient information to determine the decision response according to the response mapping table:
    accessing a dynamic decision mapping model;
    implementing the dynamic decision mapping model to determine a predictive score output based on the plurality of downstream responses received from the plurality of downstream services and a context of the service request from the client; and
    determining the decision response based on whether the predictive score output satisfies a decision response threshold.

3. The method of claim 2, wherein the response mapping table includes indications of instances when the plurality of downstream responses received from the plurality of downstream services have insufficient information to determine the decision response.

4. The method of claim 2, wherein the decision response is a positive response when the predictive score output satisfies the decision response threshold.

5. The method of claim 2, wherein the decision response threshold varies based on conditions of the plurality of downstream responses and the context of the service request.

6. The method of claim 1, wherein the information in the configuration file includes information that identifies input fields and output fields in the response mapping table to access based on the plurality of downstream services from which the plurality of downstream responses have been received.

7. The method of claim 1, wherein the response mapping table maps all possible scenarios for the downstream responses from the downstream services to at least one possible decision response.

8. The method of claim 1, further comprising updating the configuration file and the response mapping table in response to a change in the plurality of downstream services.

9. The method of claim 8, wherein the change in the plurality of downstream services includes adding a new downstream service to the plurality of downstream services.

10. The method of claim 8, wherein the change in the plurality of downstream services includes a change in information provided for a downstream response from a downstream service.

11. A gateway service system, comprising:
    a non-transitory memory; and
    a processor coupled to the non-transitory memory and configured to read instructions from the non-transitory memory to cause the gateway service system to:
        receive a service request from a client system;
        transmit requests for responses from a plurality of downstream services based on the service request;
        receive a plurality of downstream responses from the plurality of downstream services;
        access a response mapping table for the plurality of downstream responses, wherein the response mapping table maps the downstream services and their possible responses to a plurality of possible decision responses;
        access a configuration file, wherein the configuration file includes information that identifies portions of the response mapping table to implement based on the plurality of downstream services from which the plurality of downstream responses have been received;
        determine a decision response based on the plurality of downstream responses received from the plurality of downstream services, wherein instructions for determining the decision response cause the gateway service system to:
            when sufficient information is available in the plurality of downstream responses received from the plurality of downstream services:
                assess the response mapping table according to the configuration file to determine a decision response; and
                transmit the decision response to the client system determined from the response mapping table;
            when insufficient information is available in the plurality of downstream responses received from the plurality of downstream services:
                determine a predictive score output from a dynamic decision mapping model based on the plurality of downstream responses received from the plurality of downstream services and a context of the service request from the client system;
                determine the decision response based on whether the predictive score output satisfies a decision response threshold; and
                transmit the decision response to the client system determined by the predictive score output of the dynamic decision mapping model.

12. The gateway service system of claim 11, wherein the response mapping table includes indications of final decision responses when the plurality of downstream responses received from the plurality of downstream services have sufficient information to determine the decision response.

13. The gateway service system of claim 11, wherein the response mapping table includes indications to implement the dynamic decision mapping model when the plurality of downstream responses received from the plurality of downstream services have insufficient information to determine the decision response.

14. The gateway service system of claim 11, wherein the information in the configuration file identifies input fields and output fields in the response mapping table to access based on the plurality of downstream services from which the plurality of downstream responses have been received.

15. The gateway service system of claim 11, wherein the processor is configured to cause the gateway service system to identify which downstream services to transmit the requests for responses to based on the context of the service request.

16. The gateway service system of claim 11, wherein the configuration file, the response mapping table, and the dynamic decision mapping model are configured to be updated in response to a change in the plurality of downstream services.

17. A non-transitory machine-readable medium having stored thereon machine-readable instructions executable to cause a machine to perform operations comprising:
    receiving a service request from a client system;
    transmitting requests for responses from a plurality of downstream services based on the service request;
    receiving a plurality of downstream responses from the plurality of downstream services;
    determining a decision response to the service request based on the plurality of downstream responses, wherein determining the decision response includes:
        accessing a response mapping table for the plurality of downstream responses, wherein the response mapping table maps the downstream services and their possible responses to a plurality of possible decision responses;

accessing a configuration file, wherein the configuration file includes information that identifies portions of the response mapping table to implement based on the plurality of downstream services from which the plurality of downstream responses have been received;

implementing the response mapping table according to the configuration file to determine the decision response based on the plurality of downstream responses received from the plurality of downstream services; and transmitting the decision response to the client system.

18. The non-transitory machine-readable medium of claim 17, wherein the machine to perform operations is a gateway service machine for a service system.

19. The non-transitory machine-readable medium of claim 17, wherein the response mapping table is a lookup table that provides the plurality of possible decision responses mapped to possible scenarios involving the plurality of downstream responses.

20. The non-transitory machine-readable medium of claim 17, wherein the configuration file is a YAML configuration file.

* * * * *